C. T. SPURGEON.
SHAFT COUPLING.
APPLICATION FILED APR. 23, 1912.
1,058,482.
Patented Apr. 8, 1913.
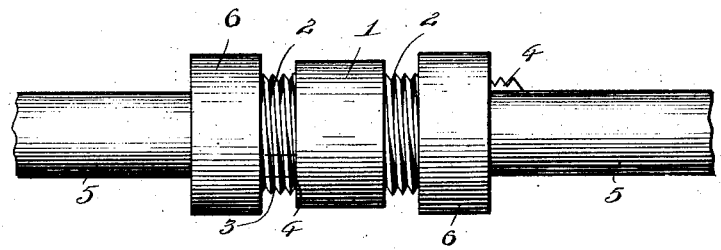
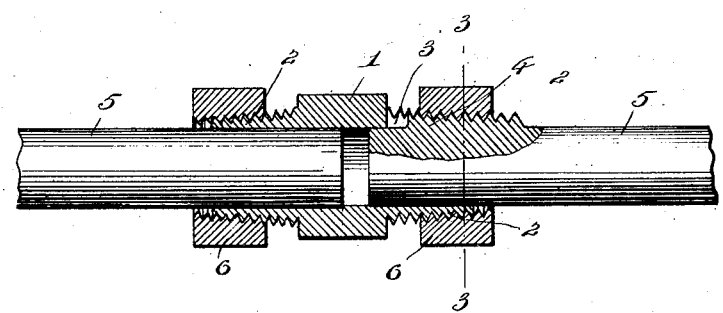
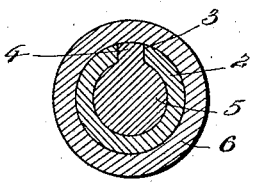
Inventor
Charles T. Spurgeon.
Witnesses
By Victor J. Evans
Attorney

UNITED STATES PATENT OFFICE.

CHARLES T. SPURGEON, OF HOMOSASSA, FLORIDA.

SHAFT-COUPLING.

1,058,482.

Specification of Letters Patent. Patented Apr. 8, 1913.

Application filed April 23, 1912. Serial No. 692,566.

*To all whom it may concern:*

Be it known that I, CHARLES T. SPURGEON, a citizen of the United States, residing at Homosassa, in the county of Citrus and State of Florida, have invented new and useful Improvements in Shaft-Couplers, of which the following is a specification.

This invention relates to shaft couplers and one of the principal objects of the invention is to provide a device of this character in which the shaft is positively locked against rotation with relation to the coupling member and is interlocked with the clamping sleeve so as to prevent relative longitudinal movement between the shaft and the coupling member.

The particular type of coupling illustrated herein is especially adapted for driving shafts of hydro-carbon engines used on motor boats and the like.

Another object of the invention is the provision of a simple and efficient device of this character in which the shaft and coupling may have their relative longitudinal positions adjusted so that in case one section of the shaft is too short to enter the coupling member fully, it may be entered into the coupling member a short distance and locked in such position.

Further objects of this invention will appear as the following specific description is read in connection with the accompanying drawing which forms a part of this application, and in which:—

Figure 1 is a side elevation showing one of the shafts partially entered into the coupling member and the opposite shaft fully entered in a coupling member with the clamping sleeve on that side of the shaft in which the coupling member is fully entered partially unscrewed from the coupling member. Fig. 2 is a longitudinal section. Fig. 3 is a transverse section on the line 3—3 of Fig. 2.

Referring more particularly to the drawing, 1 represents a tubular coupling member which is provided with oppositely extending tapered and externally threaded nipples 2 each slotted throughout its length, as shown at 3, to receive the raised and tapered keys 4 which are carried by the shaft ends 5 and are threaded upon their upper surface to correspond with the threads of the nipples 2. The clamping sleeves are shown at 6 and are internally threaded and tapered to fit over the nipples, as shown, and so as to clamp the nipples upon the shafts, said nipples having sufficient resiliency to permit this action. If sufficient resiliency is not found to be present by slotting the nipples for the reception of the keys, an additional slot may be made on the opposite side of the nipples, as will be readily understood. When the clamping sleeves are tightened up on the nipples, it will be seen that the keys are interlocked with the sleeves, which being threaded upon the nipples, makes the shafts interlock with the nipples against relative rotary or longitudinal movement. While it is preferable that the shafts extend into the nipples sufficiently for the keys to abut the coupling member, this is not necessary and the connection may be made when either one of the shafts are in the position shown in Fig. 1 or when they are only partially entered into the nipples. In securing the inwardly tapered clamping sleeves up on the externally tapered nipples, the said nipples are drawn tightly into engagement with the shaft and thereby clamp the same against a longitudinal movement even if the threads on the keys were entirely disengaged from the threads in the clamping sleeve.

What is claimed is:—

1. In combination, a pair of shafts having integral raised threaded keys thereon, a tubular coupling member having externally threaded nipples slotted to receive said keys, and collars to engage the threads of the nipple and the keys.

2. In combination, a pair of shafts, integral raised and threaded keys tapered from one end to the other, a tubular coupling member having a straight bore to receive the shaft, and externally tapered and threaded nipples slotted to receive said keys, and internally tapered collars threaded upon the nipples and having the threads thereof engaged with the threads of the keys, said collars adapted to clamp the nipples upon the shaft.

In testimony whereof I affix my signature in presence of two witnesses.

CHARLES T. SPURGEON.

Witnesses:
 I. H. HUMPHREY,
 J. F. SPURGEON.